United States Patent
Zeng et al.

(10) Patent No.: US 10,853,997 B2
(45) Date of Patent: Dec. 1, 2020

(54) OCTREE SERIALIZATION

(71) Applicant: HEWLETT-PACKARD DEVELOPMENT COMPANY, L.P., Houston, TX (US)

(72) Inventors: Jun Zeng, Sunnyvale, CA (US); Pu Huang, Palo Alto, CA (US); Sebastia Cortes, Barcelona (ES); Scott White, Barcelona (ES); Juan Manuel Garcia, Sant Cugat del Valles (ES); Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 330 days.

(21) Appl. No.: 15/545,038

(22) PCT Filed: Apr. 21, 2015

(86) PCT No.: PCT/US2015/026873
§ 371 (c)(1),
(2) Date: Jul. 20, 2017

(87) PCT Pub. No.: WO2016/171673
PCT Pub. Date: Oct. 27, 2016

(65) Prior Publication Data
US 2018/0117897 A1 May 3, 2018

(51) Int. Cl.
*G06T 17/00* (2006.01)
*G06F 16/00* (2019.01)
(Continued)

(52) U.S. Cl.
CPC .......... *G06T 17/005* (2013.01); *B29C 64/393* (2017.08); *B33Y 50/02* (2014.12); *G06F 16/2246* (2019.01); *G06F 16/583* (2019.01)

(58) Field of Classification Search
CPC ............... G06T 17/005; G06F 17/5009; G06F 16/2246; G06F 16/583
See application file for complete search history.

(56) References Cited

U.S. PATENT DOCUMENTS

| 6,014,514 | A | * | 1/2000 | Sistare | .................. | G06F 11/323 |
| | | | | | | 714/E11.181 |
| 7,263,236 | B2 | | 8/2007 | Park et al. | | |

(Continued)

FOREIGN PATENT DOCUMENTS

| CN | 1684109 | 10/2005 |
| EP | 1120227 | 8/2001 |

(Continued)

OTHER PUBLICATIONS

Frantisek Burian, Robot Mapping with Range Camera, CCD Cameras and Thermal Imagers, 2014, IEEE, p. 200-205 (Year: 2014).*

(Continued)

*Primary Examiner* — Thu Nguyet T Le
(74) *Attorney, Agent, or Firm* — HP Inc. Patent Department (57) ABSTRACT

In some examples, octree serialization can include non-transitory machine-readable medium storing instructions, the instructions executable by a processing resource to evaluate two or more nodes sequentially in an octree structure until a leaf node is reached, wherein the two or more nodes include at least one non-leaf node, and generate a serialized octree document based on a respective node identifier in a header associated with each node of the two or more nodes.

20 Claims, 4 Drawing Sheets

(51) Int. Cl.
*G06F 16/22* (2019.01)
*G06F 16/583* (2019.01)
*B33Y 50/02* (2015.01)
*B29C 64/393* (2017.01)

(56) References Cited

U.S. PATENT DOCUMENTS

| | | | |
|---|---|---|---|
| 8,558,834 B2 | 10/2013 | Lee | |
| 2005/0015173 A1 | 1/2005 | Hitoshi | |
| 2005/0195191 A1* | 9/2005 | Lee | G06T 9/40 |
| | | | 345/424 |
| 2007/0182734 A1 | 8/2007 | Levanon | |
| 2008/0024802 A1* | 1/2008 | Kato | G06F 3/1258 |
| | | | 358/1.9 |
| 2008/0238919 A1 | 10/2008 | Pack | |
| 2009/0262396 A1* | 10/2009 | Furuya | G06F 17/227 |
| | | | 358/1.15 |
| 2011/0087350 A1 | 4/2011 | Fogel | |
| 2014/0031967 A1 | 1/2014 | Unger et al. | |
| 2014/0297014 A1 | 10/2014 | Iverson et al. | |
| 2014/0324204 A1 | 10/2014 | Fogel et al. | |
| 2016/0136896 A1* | 5/2016 | Wighton | B33Y 50/00 |
| | | | 700/120 |

FOREIGN PATENT DOCUMENTS

| | | |
|---|---|---|
| EP | 1566769 | 8/2005 |
| EP | 2933777 A1 * | 10/2015 |
| WO | WO-2014210374 | 12/2014 |

OTHER PUBLICATIONS

Jan Elseberg, One bilion points in the cloud—an octree for efficient processing of 3D laser scans, Oct. 4, 2012, International Society for Photogrammetry and Remote Sensing, p. 76-88 (Year: 2012).*

Daum, S., et al; "Efficient and Robust Octree Generation for Implementing Topographical Queries for Building Information Models"; May 15, 2012; http://www.cms.bgu.tum.de/publications/2012_Daum_EG-ICE.pdf.

Armin Hornung et al; "OctoMap. An Efficient Probabilistic 3D Mapping Framework Based on Octrees"; Autonomous Robots; vol. 34, No. 3, Feb. 7, 2013, pp. 1-17; Abstract, Figures 2-4, 7; Sections 3.1, 4.1, 4.3.

Jan Elseberg et al: "Efficient Processing of Large 3D Point Clouds"; Information, Communication and Automation Technologies (ICAT); IEEE; Oct. 27, 2011; pp. 1-7, Abstract, Figures 1, 3, p. 3, left-hand column, Lines 9-29.

Jeroen Baert et al; "Out-of-Core Construction of Sparse Voxel Octrees"; Proceedings of the 5th High-Performance Graphics Conference; Jul. 19, 2013; pp. 27-32, Section 5, Figures 1-3.

* cited by examiner

OCTREE SERIALIZATION

BACKGROUND

Three dimensional (3-D) printing is a term that may be used to describe processes used to make 3-D objects. In 3-D printing, an additive process may be used to successively layer material (e.g., build material and/or print fluid) to create a 3-D object. The 3-D objects can be virtually any shape. The resolution of a printed 3-D object may be limited by the resolution of a 3-D printer used to print the 3-D object.

DETAILED DESCRIPTION

Octree serialization can include reading data from nodes, encoding data from nodes, and/or decoding data from nodes in an octree tree data structure. Reading data from the nodes in the octree structure can include obtaining a print characteristic (e.g., a shape specification of the 3-D object and/or a material specification of the 3-D object). As used herein, an octree tree data structure is an ordered collection of nodes. A 3-D object is an object that can be represented along an x-axis, a y-axis, and a z-axis. A shape specification defines a shape (e.g., geometry) of a 3-D object. A material specification defines a material(s) and/or material properties (e.g., elasticity, strength, and/or color, among other material properties) that form the 3-D object. Octree serialization can also include recording and/or writing data corresponding to the nodes to create a tree data structure representation of the 3-D object. As used herein, octree serialization is the conversion of octree data into a stream of bytes. Conversely, octree de-serialization can include the conversion of a stream of bytes into an octree. In general, octree data is stored in volatile memory, while the stream of bytes is stored in non-volatile memory.

In a number of other approaches, 3-D printing may be performed using surface meshes with a single material per 3-D object. Such approaches are typically limited to a single material per 3-D object printed.

In an effort to address such a limitation (e.g., limitation of a single material per 3-D object printed) a number of other approaches may rely on a central processing unit (CPU) based desktop applications to generate data that may be used by a 3-D printer to generate a 3-D object. However, even in such CPU based applications, use of multiple materials may rely on assignment of a respective material to each unstructured surface mesh by hand (i.e., by a user of the 3-D based desktop application). As a result, in such approaches the material is dependent on shape of the object. Further, assigning a single material to each mesh by hand is time intensive, does not provide a reusable material template, and/or does not provide continuous gradation between multiple materials, among other deficiencies. Moreover, such approaches may not print 3-D objects (e.g., may not print such objects as intended) that are represented by complex and/or sizable data sets. For example, a 3-D printer may have insufficient hardware and/or memory to receive and/or store a large data set provided by a CPU based desktop application (e.g., provided as a single package of data to the printer).

In contrast, a number of examples of the present disclosure provide octree serialization that has an ability to encode and/or decode multi-material voxel and/or octree data structures such that any voxel in the data structure can be identified. Further, examples of the present disclosure provide for a serialization and/or de-serialization scheme to write a memory object into a storage location, read the memory object from the memory location, and/or reconstruct an octree data structure based on the read memory object.

Figure 1:
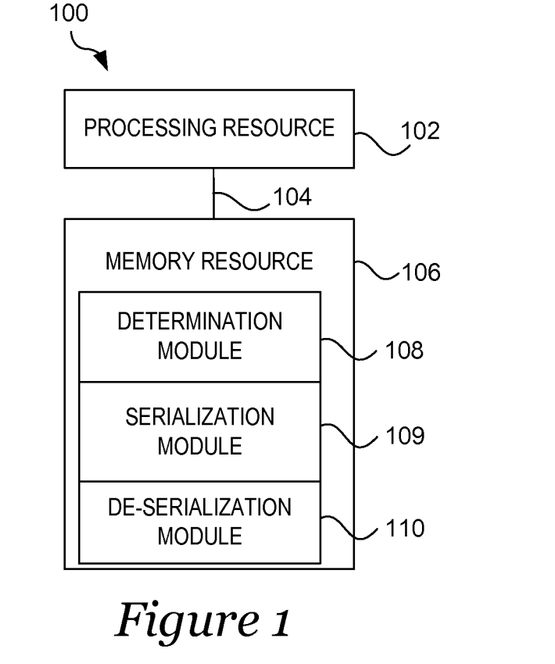
FIG. 1 illustrates a block diagram of an example of a computing device according to the present disclosure.

FIG. 1 illustrates a block diagram of an example of a computing device according to the present disclosure. The computing device 100 can include a processing resource 102 connected via link 104 to a memory resource 106, (e.g., a computer-readable medium (CRM)), machine readable medium (MRM), database, etc. The memory resource 106 can include a number of computing modules. The example of FIG. 1 shows a determination module 108, a serialization module 109, and a de-serialization module 110. As used herein, a computing module can include program code, (e.g., computer executable instructions, hardware, firmware, and/or logic), but includes at least instructions executable by the processing resource 102, (e.g., in the form of modules), to perform particular actions, tasks, and functions described in more detail herein in reference to FIGS. 2-6.

The determination module 108, as used herein and as will be explained in more detail herein, can include instructions that are executed by the processing resource 102 to evaluate two or more nodes sequentially in an octree structure until a leaf node is reached, wherein the two or more nodes include a non-leaf node and the leaf node. In some examples, the determination module 108 can include instructions that are executed by the processing resource 102 to determine, in response to the node being a leaf node, if the node is a void node or a filled node.

As used herein, a "non-leaf node" is an octree node that has offspring (e.g., child) nodes, while a "leaf node" is a node that does not have offspring (e.g., child) nodes. In some examples, a non-leaf node can carry the octree structure, while a leaf node can carry physical properties of the system. As an example, a leaf node can carry at least one print characteristic regarding the system. As used herein, a "print characteristic" is a location (e.g., coordinates, size, etc.), material, and/or other associative quantity that describes what is to be printed and/or where it is to be printed to form the 3-D object. In some examples, a print characteristic carried by a leaf node can specify a single material type or material identification.

For example, a print characteristic can describe the shape (e.g., geometry) of the 3-D object. A single shape specification can describe the 3-D object or each of a plurality of shape specifications can describe a plurality of portions of the 3-D object. The material specifications can describe the materials and/or a number of material property values associated with the material(s) that form the 3-D object. That is, the material specification can be defined by a material value (e.g., a plurality of material property values).

The serialization module 109 can include instructions that are executed by the processing resource 102 to generate a serialized octree document based on a respective node identifier in a respective header associated with each node of the two or more nodes, wherein the respective node identifier identifies nodes of the two or more nodes as including a leaf node and at least one non-leaf node. As used herein, a "node identifier" is an indication (e.g., an integer) stored in the header of a word associated with a node that can identify the node as a non-leaf node or a leaf node.

As discussed further herein, in some examples, generating the serialized octree document can include recording, in a header associated with the node, a first integer in response to the determination that the node is a non-leaf node. Generating the serialized octree document can further include recording, in the header associated with the node, a second integer in response to the determination that the node is a void leaf node. In some examples, a material type can be defined as void, and the void material type can be recorded in a payload associated with a node in response to the determination that the node is a void leaf node.

The de-serialization module 110 can include instructions that are executed by the processing resource 102 to increment a counter in response to the respective node identifier identifying a node of the two or more nodes as a non-leaf node. In some examples, the de-serialization module 110 can include instructions that are executed by the processing resource 102 to record a position of a child node in the octree structure in response to the node identifier identifying the node of the two or more nodes as a non-leaf node.

In some examples, the de-serialization module 110 can include instructions that are executed by the processing resource 102 to record an integer or integers representing void in a respective payload of a word corresponding to a node of the two or more nodes in response to a respective node identifier in a header identifying the node as a void leaf node, and record information in the respective payload of the word corresponding to a node of the two or more nodes in response to the respective node identifier in the header identifying a filled leaf node.

The number of modules shown in FIG. 1 (e.g., determination module 108, serialization module 109, and de-serialization module 110) can be combined with other modules or be sub-modules of other modules. The modules can be stored in a memory resource 106 as shown in FIG. 1 and/or be contained within the same computing device. In another example, the number of modules (e.g., determination module 108, serialization module 109, and de-serialization module 110) can comprise individual modules at separate and distinct locations on different memory resources (e.g., CRM, etc.) such as in a distributed computing environment, (e.g., cloud computing environment). Further, the processing resource 102 executing instructions associated with a particular module, (e.g., determination module 108, serialization module 109, and de-serialization module 110), can function as an engine, such as the example engines shown in FIG. 2. As used herein, the number of modules and/or the number of engines can include more or less engines/modules than those shown.

Figure 2:
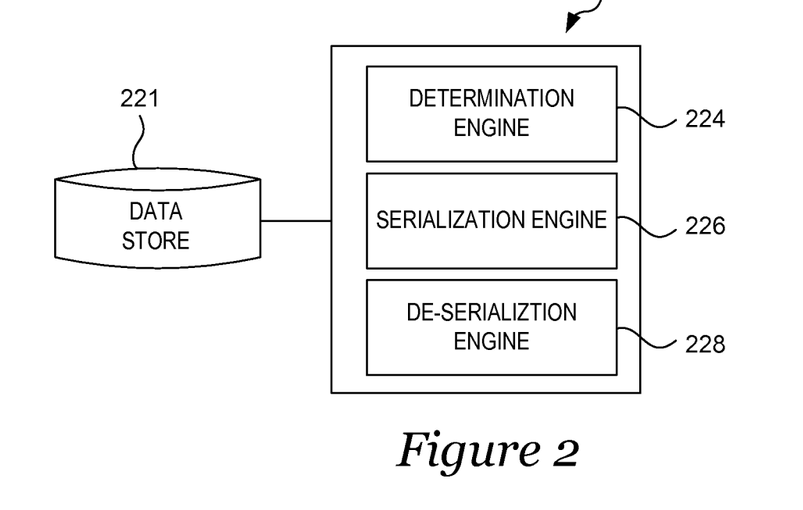
FIG. 2 illustrates a block diagram of an example of a system for octree serialization according to the present disclosure.

FIG. 2 illustrates a block diagram of an example of a system 220 for octree serialization according to the present disclosure. The system 220 can perform a number of functions and operations as described herein (e.g., octree serialization). The system 220 can include a data store 221. The example of FIG. 2 shows a determination engine 224, a serialization engine 226, and a de-serialization engine 228. The system 220 can include hardware, for example, in the form of transistor logic and/or application specific integrated circuitry (ASICs), firmware, and software, for example, in the form of machine readable and executable instructions (e.g., program instructions stored in a machine readable medium), which, in cooperation can form the computing device as discussed in connection with FIG. 1.

In the example of FIG. 2, the determination engine 224 can include hardware and/or a combination of hardware and programming (e.g., executable instructions), but at least hardware, to evaluate two or more nodes sequentially in an octree structure until a leaf node is reached, wherein the two or more nodes include a non-leaf node and the leaf node.

The serialization engine 226 can include hardware and/or a combination of hardware and programming, but at least hardware, to generate a serialized octree document based on a respective node identifier in a respective header associated with each node of the two or more nodes, wherein the respective node identifier identifies nodes of the two or more nodes as including a leaf node and at least one non-leaf node. In some examples, the node identifier can include a first integer that identifies a node as a non-leaf node (e.g., a zero), or the node identifier can include a second integer (e.g., a one) that identifies the node as a leaf node. Examples are not so limited, and the first integer can identify a node as a non-leaf or leaf node (e.g., the first integer can be a zero if the node is a non-leaf node and a one if the node is a leaf node), while the second integer can identify a node as being void or filled in response to the first integer identifying the node as a leaf node (e.g., the second integer can be a zero is the leaf node is void, and a one if the leaf node is filled). Examples are not limited to these specific values of integers.

The de-serialization engine 228 can include hardware and/or a combination of hardware and programming, but at least hardware, to increment a counter in response to the respective node identifier identifying a node of the two or more nodes as a non-leaf node, and record a position of a child node in the octree structure in response to the node identifier identifying the node of the two or more nodes as a non-leaf node.

In some examples, the de-serialization engine 228 can include hardware and/or a combination of hardware and programming, but at least hardware, to record an integer representing void in a respective payload of a word corresponding to a node of the two or more nodes in response to a respective node identifier in a header identifying the node as a void leaf node, and record information in the respective payload of the word corresponding to a node of the two or more nodes in response to the respective node identifier in the header identifying a filled leaf node.

The determination engine 224, the serialization engine 226, and the de-serialization engine 228 shown in FIG. 2 and/or the determination module 108, the serialization module 109, and the de-serialization module 110 in FIG. 1 can be sub-engines/modules of other engines/modules and/or combined to perform particular actions, tasks, and functions within a particular system and/or computing device. Further, the engines and/or modules described in connection with FIGS. 1 and 2 can be located in a single system and/or computing device or reside in separate distinct locations in a distributed computing environment, (e.g., cloud computing environment). Examples are not limited to these examples.

Figure 3:
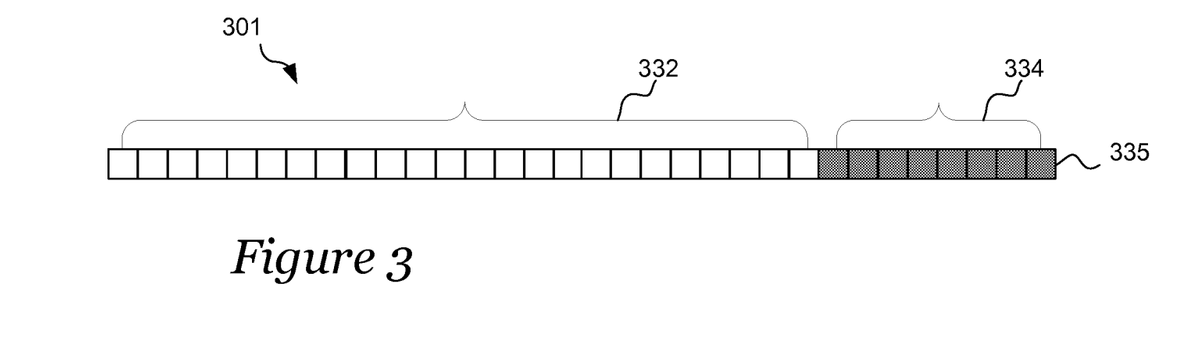
FIG. 3 illustrates an example of a word according to the present disclosure.

FIG. 3 illustrates an example of a word 301 according to the present disclosure. In some examples, the word 301 can contain code for a node (e.g., node 440-1 illustrated in FIG. 4). The word 301 can include a payload section 332 and/or a header section 334. The word 301 can contain 32 bits for graphics processing unit (GPU) acceleration; however, examples are not limited to a word containing a particular number of bits.

In the example where the word contains 32 bits, the payload section 332 can contain 24 bits and the header section 334 can contain 8 bits, for example. In some examples, the header section 334 of the word 301 can record whether a node is a leaf node (e.g, node 440-1 illustrated in FIG. 4) or a non-leaf node (e.g., void leaf node 442-1, filled leaf node 444-1 illustrated in FIG. 4).

Figure 4:
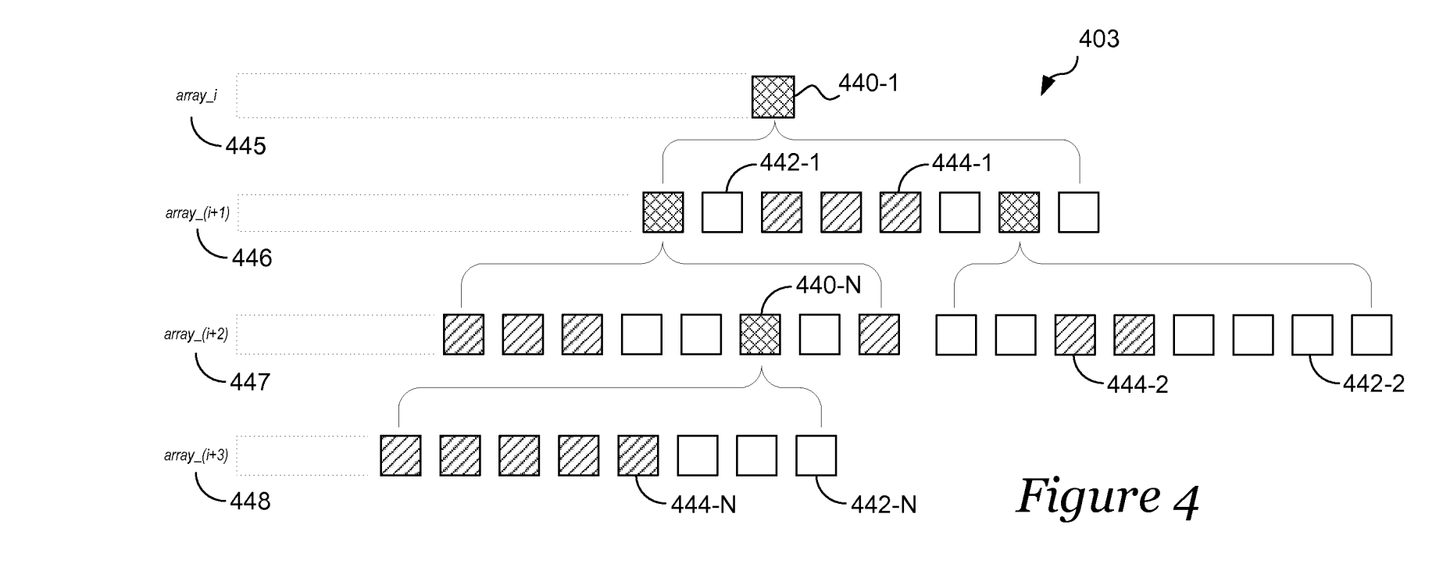
FIG. 4 illustrates an example of an octree according to the present disclosure.

FIG. 4 illustrates an example of an octree structure 403 according to the present disclosure. The octree structure 403 can include a plurality of arrays (e.g, array_i 445, array_(i+1) 446, array_(i+2) 447, array_(i+3) 448, etc.) which can correspond to a hierarchal relationship of the octree 403. For example, node 440-1 can be a parent node and can be located in array_i 445. All of the children (e.g., the nodes in array_(i+1) 446) of parent node 440-1 can be located in array_(i+1) 446, etc. In some examples, the child nodes of each array can be placed in their respective arrays according to a particular ordering sequence. In this regard, a parent node 440-1, . . . , 440-N can determine the location of each of its children and/or uniquely identify each of its children. As an example, node 440-1 can determine the location and/or uniquely identify each of its children, for example, the nodes of array_(i+1) 446.

Each of the plurality of arrays can include one or more nodes 440-1, . . . 440-N, 442-1, . . . , 442-N, 444-1, 444-2, . . . , 444-N, etc. (referred to herein generally as nodes 440, 442, 444). Each of the plurality of nodes 440, 442, 444 can represent a node that is either a non-leaf node (e.g., node 440), a void leaf node (e.g., node 442), or a filled leaf node (e.g., node 444). In the example of FIG. 4, different types of nodes are represented by different shading. For example, nodes filled in with cross-hatch (e.g., nodes 440) are non-leaf nodes, nodes filled in with diagonal lines (e.g., nodes 444) are filled leaf nodes, and nodes with no fill (e.g., nodes 442) are void leaf nodes.

If the node is a leaf node 440, at least one print characteristic (e.g., a material identification, etc.) can be recorded in the payload section 332 of the word 301. If the node is a non-leaf node 442, 444, a position of a child node can be recorded in the payload section 332 of the word 301. For example, payload section 332 of word 301 can record the position of the child node in an array (i+1) 446.

In some examples, the header section 334 of the word 301 can record if the child node is a leaf node 440 or non-leaf node 442, 444. This can provide additional error checking for the octree document. The header section 334 of the word 301 can be used to record whether or not a child node is trivial or non-trivial. As used herein, a "trivial" node is a node with no information in the payload section 332 associated with the node, while a "non-trivial" node is a non-leaf node or a leaf node containing information in the payload section 332 associated with the node. For example, header section 334 of word 301 can record that node 442 is trivial (e.g., void), or header section 334 can record that node 440, 444 are non-trivial. In this example, memory space can be conserved by not recording the trivial children in the array.

In this regard, the header section 334 of the word 301 can provide sufficient information to allow each child to be identified without recording and/or checking information contained in the payload section 332 of the word 301.

According to a number of examples, the octree structure 403 can be constructed and/or traversed based on information encoded into the header 334 of the word 301, as described above. For example, the octree structure 403 can be constructed starting from a non-leaf (e.g., a root) node. In the example of FIG. 4, array_i 445 contains a single element: non-leaf node 440-1.

For each additional level (e.g., each additional array) in the octree structure 403, a counter can be incremented in response to a non-leaf node. For example, a counter can record the number of non-leaf nodes in the system. For a respective non-leaf node in the octree structure 403, the first child of the respective non-leaf node can be determined by subtracting one from the counter and multiplying by eight. Examples are not so limited; however, and the number of children can be counted, for example, when children of non-homogeneous size are recorded.

In some examples, the octree structure 403 can be traversed starting at array_i 445 and reading the non-leaf (e.g., root) node 440-1. The first child node (e.g., 441-1) can be located based on information contained in the header 334 of the word 301 associated with non-leaf node 440-1. In an octree structure 403, the following seven elements in the array_(e.g., array_(i+1) 446) are also children of non-leaf node 440-1. This process can be repeated until a filled leaf node 444 is reached and a print characteristic can be retrieved from the payload 332 of the word 301 associated with the filled leaf node 444.

In some examples, the octree structure 403 can be associated with a grid of voxels (e.g., 3-D grid of voxels). As used herein, a voxel represents a value on a 3-D space. A voxel can be a volume associated with the 3-D space. The voxel can have a value of solid, empty, or a differently defined description of the 3-D space. The position of a voxel can be inferred based upon its position relative to other voxels.

The octree structure 403 can represent arbitrary shapes (e.g., convex, concave, and/or with holes) and can carry nodal attributes to represent any material distribution (e.g., material types and/or material properties). An octree can compress the voxel data structure by using the largest possible voxels to represent homogeneous regions. As used herein, a region is homogeneous when a voxel (e.g., a node) in the tree data structure (e.g., octree) has a uniformity of shape, material type, and/or material properties without shape boundaries, material type boundaries and/or material properties boundaries intersecting the multiple neighboring nodes.

In some examples, the octree structure 403 can be written to a file for future use or for other applications. That is, octree serialization can allow for the octree to be exported or to be streamed to a 3-D printer. For example, an octree that is created to print a 3-D object on a first 3-D printer can be re-used to print the 3-D object on a second 3-D printer with a different printing resolution than the first 3-D printer without having to recreate the octree.

In some examples, at each level (e.g., each array) of the octree structure 403, a node identifier can be written to the header 334 of a word 301 associated with the node (e.g., node 440-1). In some examples, the node identifier can be a zero, which can be written to the header 334 associated with the node if the node is a non-leaf node. The node identifier can be written into a particular block (e.g., block 335) in the header 334. Examples are not so limited, however, and the node identifier can be written to any block in the header 334. In some examples, if the node (e.g., 442, 444) is a leaf node, a one can be written to the header 334 if the leaf node is void (e.g., 442), and the payload 332 can be written if the leaf node is filled (e.g., 444). In the case of a filled leaf node 444, a counter can be offset by two, and the process can start again from a non-leaf node 440.

Figure 5:
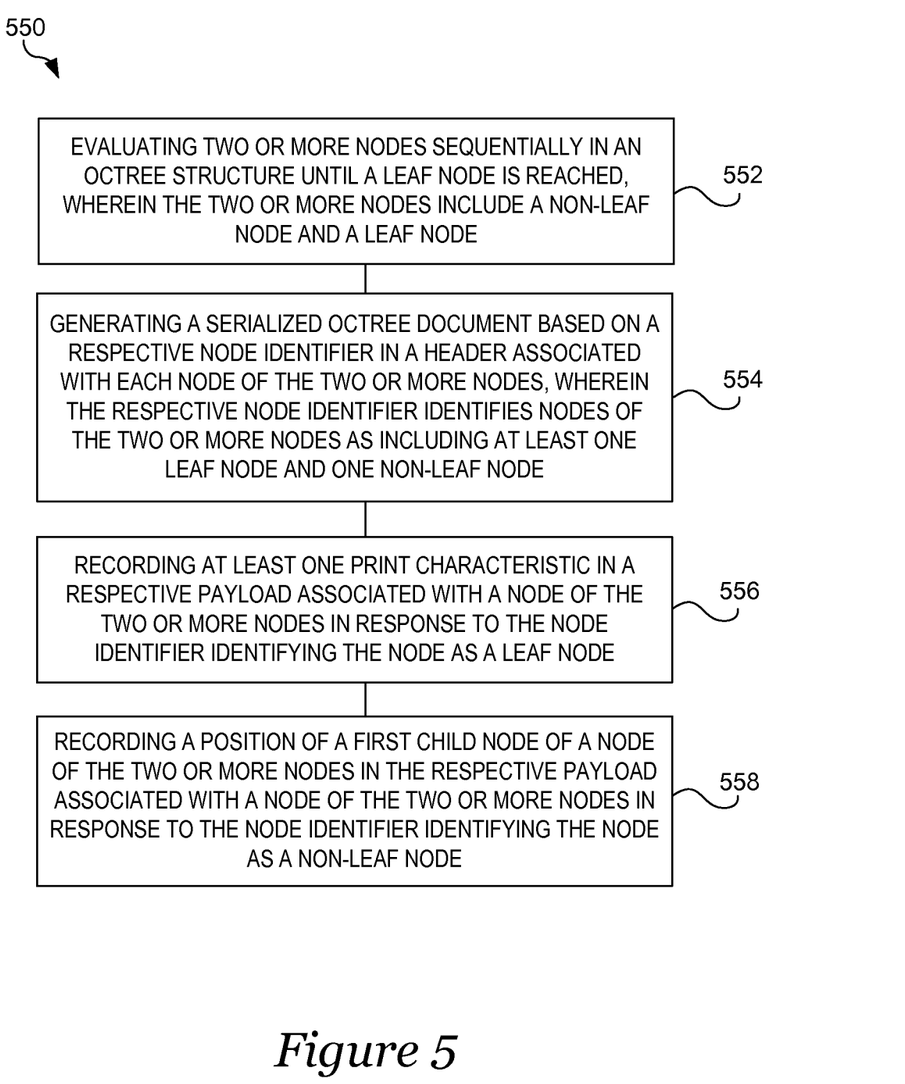
FIG. 5 illustrates a flow diagram of an example of a method for octree serialization according to the present disclosure.

FIG. 5 illustrates a flow diagram of an example of a method 550 for octree serialization according to the present disclosure. At 552 the method 550 can include evaluating two or more nodes sequentially in an octree structure until a leaf node is reached, wherein the two or more nodes include a non-leaf node and a leaf node.

At 554, the method 550 can include generating a serialized octree document based on a respective node identifier in a header associated with each node of the two or more nodes, wherein the respective node identifier identifies nodes of the two or more nodes as including at least one leaf node and at least one non-leaf node. In some examples, a serialized octree document can have a file size that is comparatively less than a resultant file size from a stereolithography approach. This comparatively smaller size can be due at least in part to the ability to skip over trivial (e.g., void) nodes provided by the node identifier. That is, by using the node identifier to pass over trivial nodes, the overall structure of an octree can be preserved without reading, storing, or writing data regarding the trivial nodes. In some examples, the comparatively smaller file size can be due at least in part to octree serialization that can result in a comparatively large voxel to represent homogenous regions, as described above.

At 556, the method 550 can include recording at least one print characteristic in a respective payload associated with a node of the two or more nodes in response to the node identifier identifying the node as a leaf node.

At 558, the method 550 can include recording a position of a first child node of a node of the two or more nodes in the respective payload associated with a node of the two or more nodes in response to the node identifier identifying the node as a non-leaf node.

In some examples, the method 550 can include determining whether the first child node is a leaf node or a non-leaf node based on information contained in the respective header associated with the first child node. The method 550 can further include recording at least one print characteristic in a respective payload associated with the child node in response to the node identifier identifying the child node as a leaf node, and recording a position of a second child node in the respective payload associated with the first child node in response to the node identifier identifying the first child node as a non-leaf node. In some examples, the position of the second child node and the next seven child nodes of an array including the second child node can be recorded in the header and/or payload of the first child node in response to the node identifier identifying the first child node as a non-leaf node. Examples are not so limited, and once a position of a first child is determined in response to the node identifier of the parent node identifying the parent node as a non-leaf node, the seven nodes following the first child node in an array can be children to the parent node.

In some examples, the method 550 can include recording a respective position of each of eight child nodes of the first node in response to the node identifier identifying the node of the two or more nodes as a non-leaf node. For example, the header associated with the node can include eight bits and one of each of the eight bits can correspond to a respective position of each of eight child nodes to the first node.

The method 550 can include recording at least one node property corresponding to each of the eight child nodes in the octree structure in the header associated with a non-leaf node. As used herein, a "node property" is an indication of aggregate properties of the child nodes. For example, a sum, weighted sum, and/or Boolean property of the aggregate eight child nodes can be recorded. In some examples, when the octree structure is decoded, the node property can be compared to information stored in the header associated with the parent node to provide error checking.

Figure 6:
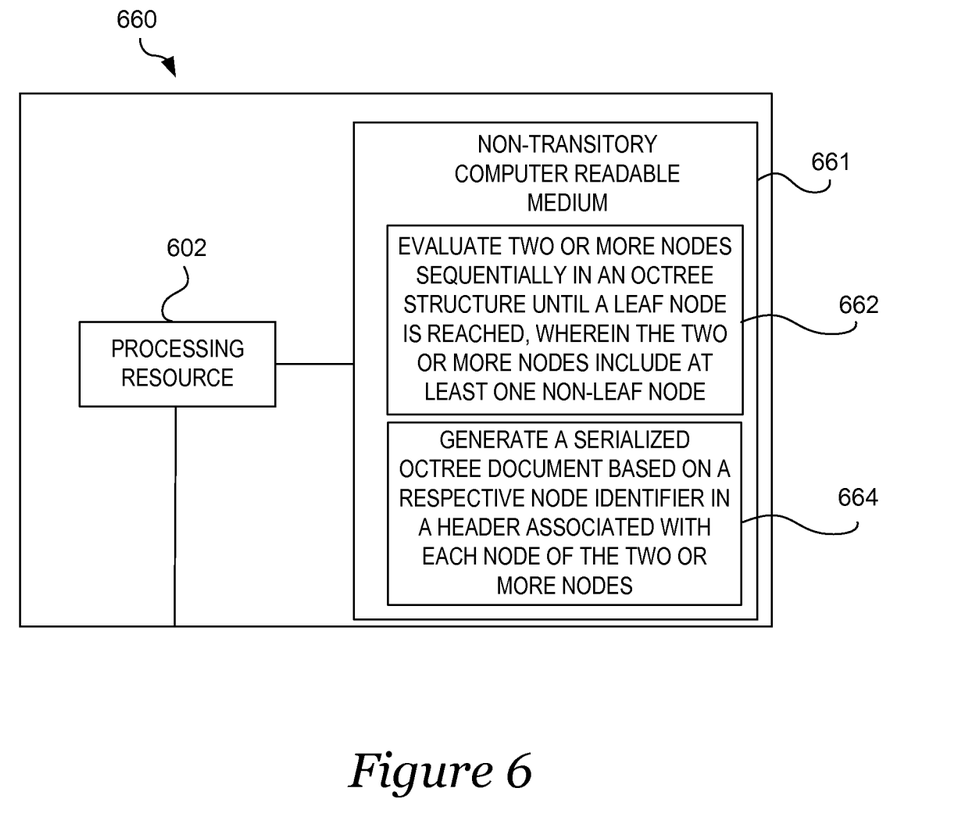
FIG. 6 illustrates a diagram of an example of a system including a processing resource and non-transitory computer readable medium storing executable instructions according to the present disclosure.

FIG. 6 illustrates a diagram of an example of a system 660 including a processing resource 602 and non-transitory computer readable medium 661 storing executable instructions according to the present disclosure. For examples, the system 660 can be an implementation of the example system 220 of FIG. 2.

The processing resource 602 can be configured to execute instructions stored on the non-transitory computer readable medium 661. For example, the non-transitory computer readable medium 661 can be any type of volatile or non-volatile memory or storage, such as random access memory (RAM), flash memory, read-only memory (ROM), storage volumes, a hard disk, or a combination thereof. When executed, the instructions can cause the processing resource 602 to perform octree serialization, such as the method described with respect to FIG. 5.

The example medium 661 can store instructions 662 executable by the processing resource 602 to evaluate two or more nodes sequentially in an octree structure until a leaf node is reached, wherein the two or more nodes include at least one non-leaf node. In some examples, the processing resource 602 can execute instructions 662 to perform block 552 of the method of FIG. 5.

The example medium 661 can further store instructions 664. The instructions 664 can be executable to generate a serialized octree document based on a respective node identifier in a header associated with each node of the two or more nodes. In some examples, the respective node identifier in the header can identify a node as a non-leaf node, a void leaf node, or a filled leaf node. The serialized octree document can have a file size that is comparatively less than a resultant file size from a stereolithography approach.

The example medium 661 can further store instructions executable by the processing resource 602 to determine a position of a child node in the octree structure in response to the respective identifier corresponding to a non-leaf node. In some examples, the example medium 661 can further store instructions executable by the processing resource 602 to read a print characteristic associated with at least one of the two or more nodes in response to the respective identifier corresponding to a filled leaf node.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. The proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A non-transitory machine-readable medium storing instructions, the instructions executable by a processing resource to process an octree structure that describes an object to be produced by additive manufacture, the octree structure being composed of nodes, with a data word from each node being divided into a header and a payload, the header of each node comprising a node identifier, the node identifier being a numeric indication that provides identifying information about a respective node, the payload of each node comprising specification of a characteristic for forming a corresponding portion of the object,
the instructions executable by the processing resource to:
evaluate two or more nodes sequentially in an octree structure until a leaf node is reached, wherein the two or more nodes include at least one non-leaf node;
generate a serialized octree document based on a respective node identifier in a header associated with each node of the two or more nodes; and
utilize the serialized octree document to form an object described by the octree structure using the serialized octree document to guide operation of a 3-D printer.

2. The non-transitory machine-readable medium of claim 1, wherein the serialized octree document has a file size that is comparatively less than a resultant file size from a stereolithography approach.

3. The non-transitory machine-readable medium of claim 1, wherein the respective node identifier in the header identifies a node as a non-leaf node.

4. The non-transitory machine-readable medium of claim 3, wherein the instructions include instructions to determine a position of a child node in the octree structure in response to the respective node identifier corresponding to a non-leaf node.

5. The non-transitory machine-readable medium of claim 1, wherein the respective node identifier in the header identifies a node as a void leaf node.

6. The non-transitory machine-readable medium of claim 1, wherein the respective node identifier in the header identifies a node as a filled leaf node.

7. The non-transitory machine-readable medium of claim 6, wherein the instructions include instructions to read a print characteristic associated with at least one of the two or more nodes in response to the respective node identifier corresponding to a filled leaf node.

8. The non-transitory machine-readable medium of claim 1, wherein the instructions include instructions to selectively utilize the payload section of the word to specify material to be used in forming a corresponding portion of the object described by the node.

9. The non-transitory machine-readable medium of claim 8, wherein the instructions include instructions to extract a print characteristic from the payload section of a word for a node for inclusion in the serialized octree document.

10. The non-transitory machine-readable medium of claim 8, wherein the header indicates when the payload section of a word for a node is trivial, having no information in the payload section.

11. A computing system, comprising:
a computing device comprising a processing resource in communication with a memory resource, the memory resource to store an octree structure that describes an object to be produced by additive manufacture, the octree structure being composed of nodes, with a data word from each node being divided into a header and a payload, the header of each node comprising a node identifier, the node identifier being a numeric indication that provides identifying information about a respective node, the payload of each node comprising specification of a characteristic for forming a corresponding portion of the object;
the processing resource and memory resource to implement all of:
a determination engine to evaluate two or more nodes sequentially in the octree structure until a leaf node is reached, wherein the two or more nodes include a non-leaf node and the leaf node;
a serialization engine to generate a serialized octree document based on a respective node identifier in a respective header associated with each node of the two or more nodes, wherein the respective node identifier identifies nodes of the two or more nodes as including a leaf node and at least one non-leaf node; and
a de-serialization engine to:
increment a counter in response to the respective node identifier identifying a node of the two or more nodes as a non-leaf node; and
record a position of a child node in the octree structure in response to the node identifier identifying the node of the two or more nodes as a non-leaf node; and
the computing device further comprising an output to provide the serialized octree document to an additive manufacturing device to form an object based on the serialized octree document.

12. The system of claim 11, the de-serialization engine to:
record an integer representing void in a respective payload of a word corresponding to a node of the two or more nodes in response to a respective node identifier in a header identifying the node as a void leaf node; and
record information in the respective payload of the word corresponding to a node of the two or more nodes in response to the respective node identifier in the header identifying a filled leaf node.

13. The system of claim 12, wherein the information recorded in the payload of the word includes at least one print characteristic.

14. The system of claim 11, wherein each node has an associated word comprising the header and a payload section, and wherein the serialization engine is to selectively utilize data from the payload section of the word in the serialized octree document.

15. The system of claim 14, wherein the serialization engine is to extract a print characteristic from the payload section of a word for a node for inclusion in the serialized octree document.

16. A method, comprising:
utilizing an octree structure that describes an object to be produced by additive manufacture, the octree structure being composed of nodes, with a data word from each node being divided into a header and a payload, the header of each node comprising a node identifier, the node identifier being a numeric indication that provides identifying information about a respective node, the payload of each node comprising specification of a characteristic for forming a corresponding portion of the object;

evaluating two or more nodes sequentially in the octree structure until a leaf node is reached, wherein the two or more nodes include a non-leaf node and a leaf node;

generating a serialized octree document based on a respective node identifier in a header associated with each node of the two or more nodes, wherein the respective node identifier identifies nodes of the two or more nodes as including at least one leaf node and at least one non-leaf node;

recording at least one print characteristic in a respective payload associated with a node of the two or more nodes in response to the node identifier identifying the node as a leaf node;

recording a position of a first child node of a node of the two or more nodes in the respective payload associated with a node of the two or more nodes in response to the node identifier identifying the node as a non-leaf node; and utilizing the serialized octree document in an additive manufacturing machine to produce the object as described by the serialized octree document.

17. The method of claim 16, further including:

determining whether the first child node is a leaf node or a non-leaf node based on information contained in the respective header associated with the first child node;

recording at least one print characteristic in a respective payload associated with the first child node in response to the node identifier identifying the child node as a leaf node; and recording a position of a second child node in the respective payload associated with the first child node in response to the node identifier identifying the first child node as a non-leaf node.

18. The method of claim 16, further including recording a respective position of each of eight child nodes of the first node in response to the node identifier identifying the node of the two or more nodes as a non-leaf node.

19. The method of claim 18, including recording at least one node property corresponding to each of the eight child nodes in the octree structure in the header associated with a non-leaf node.

20. The method of claim 16, wherein the header is an 8 bit header included in a 32 bit word.

\* \* \* \* \*